United States Patent [19]

Forrest

[11] Patent Number: 4,597,267

[45] Date of Patent: Jul. 1, 1986

[54] FAST CYCLE WATER VAPOR CRYOPUMP

[75] Inventor: Scott M. Forrest, San Rafael, Calif.

[73] Assignee: Marin Tek, Inc., San Rafael, Calif.

[21] Appl. No.: 749,805

[22] Filed: Jun. 28, 1985

[51] Int. Cl.$^4$ ............................................... B01D 8/00
[52] U.S. Cl. ...................................... 62/55.5; 55/269; 62/268; 62/278
[58] Field of Search ................ 62/55.5, 100, 268, 278; 55/269

[56] References Cited

U.S. PATENT DOCUMENTS

| | | | |
|---|---|---|---|
| 3,602,004 | 8/1971 | Peavler | 62/278 |
| 3,677,025 | 7/1972 | Payne | 62/278 |
| 3,768,273 | 10/1973 | Missimer | 62/114 |
| 4,506,513 | 3/1985 | Max | 62/55.5 |
| 4,535,597 | 8/1985 | Missimer et al. | 62/55.5 |

*Primary Examiner*—Ronald C. Capossela
*Attorney, Agent, or Firm*—Jay M. Cantor

[57] ABSTRACT

The disclosure relates to a refrigeration system wherein the evaporator of the refrigeration system is placed within a vacuum system as a "Meissner" coil previously described. Optionally it may be provided with extended surface(s). The cryosurface has a single tube passage for flow of either an evaporating low temperature refrigerant fluid for cooldown and continuous cold operation, or superheated compressed refrigerant gas for adding heat during the defrost cycle. Appropriate valves select whether cold fluid or superheated refrigerant gas flows through the tube in the cryosurface. A recuperative heat exchanger and a superheating exchanger preheat, in two stages, a cold compressed refrigerant gas stream after the gas has been rectified within the system. This superheated gas stream defrosts the cryosurface, flows back through the recuperative heat exchanger where it is recooled and then is reintroduced into the cold cascade heat exchangers.

12 Claims, 1 Drawing Figure

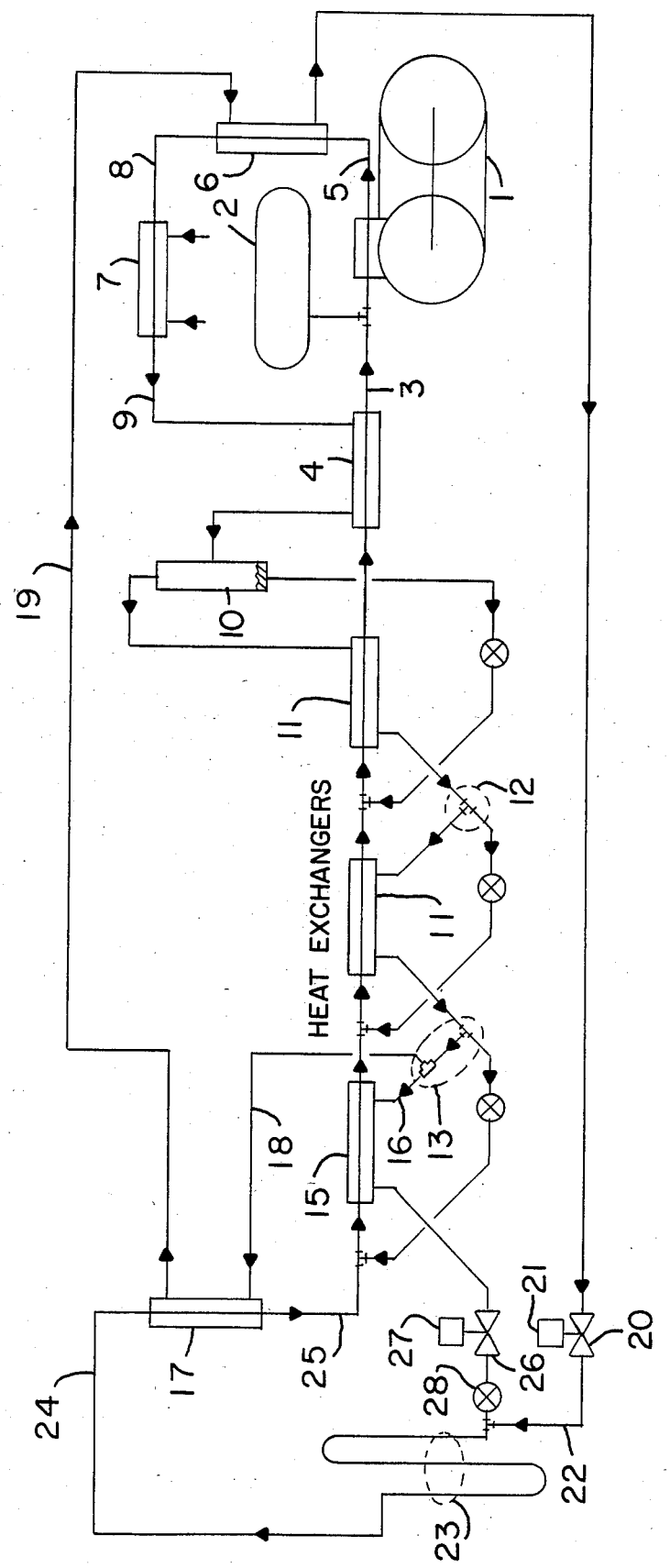

FAST CYCLE WATER VAPOR CRYOPUMP

BACKGROUND OF THE INVENTION

1. Field of the Invention

This invention relates to high vacuum water vapor cryopumps.

2. Description of the Prior Art

High vacuum chambers used for production processes, as well as research and development, are evacuated by a variety of means, including mechanical or sorption "roughing" pumps for preliminary stages, and then diffusion, turbomolecular, ion, titanium sublimation and, most recently, helium refrigeration (cryo) pumps. Those in the latter group are considered high vacuum pumps which are suitable for operation in the deeper vacuum range after the chamber has been "roughed" down to a "crossover" pressure. This "crossover" pressure depends upon the gas load tolerance of the high vacuum pump. The high vacuum pump is started long before the "crossover" pressure is reached and is usually operated continuously, but isolated from the chamber, by a large aperture valve located in a suitable manifold or port. When the high vacuum isolation valve is opened and "rough" pumping is stopped, the chamber is then pumped at a high rate by the high vacuum pump to its operating pressure level.

Gas loads in the chamber vary considerably from one application to another. Initially, the air gases including nitrogen, oxygen and water vapor are removed. Later, in the pumpdown process, water vapor becomes the dominant gas due to desorption from internal surfaces. Some plasma processes require introduction of inert gases, such as argon, and reactive gases, such as oxygen or halogens. In such cases, it is desirable to pump water vapor at high speeds without removing the introduced gases too rapidly, i.e., to selectively pump the water vapor. Water vapor can dissociate and create undesirable oxygen and hydrogen gases.

Pumps vary in their ability to remove different gas species, depending upon their operating principles. A combination of more than one type of high vacuum pump may be desireable. One solution to the problem of high water vapor loads was introduced in the 1950s by C. R. Meissner. A lightweight coil of tubing, placed directly in the vacuum chamber, is cooled by liquid nitrogen flowing therethrough. A Meissner coil cryopumps water vapor at high rates. Unfortunately, it also cryopumps $CO_2$ when overcooled by liquid nitrogen. This disadvantage is discussed in more detail hereinbelow. The coil must by quickly warmed when the vacuum chamber is to be opened to atmosphere to preclude moisture condensation from the external environment. This is usually done using heated and pressurized nitrogen gas to expel liquid nitrogen and to warm the coil. After the chamber is unloaded, reloaded and roughed down, the Meissner coil is quickly recooled concurrent with opening the high vacuum valve and using the high vacuum pump for pumping of the chamber.

Another method of removing water vapor at high rates with limited pumping of gases, such as argon, uses a modified helium cryopump with a throttle attached to the warmer first refrigeration stage. The throttle is cold enough to cryopump water vapor, but permits argon and other "permanent" gases to pass on (at restricted flow rate) to be pumped by first and second stages.

Most high vacuum pumps are not capable of being started at atmospheric pressure but, rather, they must be isolated from the the chamber by a valve. The valve plus a manifold, (if present), and aperture between the chamber and pump all reduce gas conductance to the pump with a resulting pumping speed reduction. Larger or additional pumps can be added to handle large pumping loads. Usually, the largest load (65-95%) is water vapor. Therefore gas pumping speeds do not accurately match the load.

Meissner coils, which are placed directly in chambers and used as supplemental pumps for cryopumping water vapor, when cooled by liquid nitrogen, are costly to operate. This is due to the continuous and wasteful nitrogen consumption. Meissner coils also have some inherent safety problems and are difficult to warm up to room temperature in less than about five minutes. In addition, Meissner coils operate at such low temperatures that they cryopump or cryotrap some $CO_2$ vapors at typical processing pressures. The chamber pressure can then seriously fluctuate if the coil temperature varies more than about 0.10 C. It is difficult to control surface temperatures this closely, and liquid entrainment in exhausting vapors occurs as a consequence.

Helium cryopumps pump water vapor about three times as fast as air, or $3\frac{1}{2}$ times as fast as argon, but still not proportional to typical gas loads. Also, because they are capture pumps, cryopumps must periodically be regenerated to dispose of captured gases. A total regeneration cycle requires about three to four hours, the chamber not being usable during this period. Care must be taken in removal of gases from the cryopump during regeneration. Cooling capacity is quite limited, making the cryopump unable to handle significant thermal radiation heat loads, e.g., viewing surfaces above about 50 degrees C. Periodic changing of a helium purifying cartridge is also required. Helium cryopumps with refrigerated throttle devices have two potential problems: (1) cryopumping action of water vapor is far removed from the vapor source and is somewhat conductance limited by an aperture and high vacuum valve, and (2) the throttle limits the pumping of all gases, including hydrogen and oxygen, which is undesirable. U.S. Pat. No. 4,535,597 describes a "Fast Cycle Water Vapor Cryopump" which minimizes the above problems of the prior art. However, there are some applications which make it difficult or impossible to use the cryopump with its two independent cooling and defrost circuits and twin thermally bonded tube construction. In some instances, it is desirable to retain an existing "Meissner" cryosurface which has a single tube passage, e.g. one designed for use with liquid nitrogen as a cooling medium, and to rapidly cool and to rapidly heat/defrost the tube using a mixed refrigerant self-refrigerating cascade system. In other instances, fabrication difficulties do not, or chamber space does not, permit the use of the twin tube design for the cryosurface. In yet other cases, stainless steel, which has a very low thermal conductivity, and hence is not suitable for the dual tube application, must be used as a construction material to preclude contamination of the high vacuum deposition chamber.

It would appear possible to have both cooling and heating fluids flow through a single tube in the "Meissner" cryosurface rather than to use a twin tube design incorporated therein. However, this creates problems. To better understand why this is not a practical design and referring to the figure, warm refrigerant fluid leaves the cryosurface 23 during the latter part of the defrost period and must return to the compressor 1 without warming the cascade heat exchangers 11 because a mixed refrigerant self-refrigerating cascade system cannot produce adequate cooling unless these exchangers 11 are at their normal cold level. Also, the discharge pressure of compressor 1 will rise unacceptably high. On the other hand, if the outlet of the cryosurface 23 is routed to bypass cascade heat exchangers 11 and to flow directly to the compressor 1, then the return refrigerant flow during normal cooling of the cryosurface 23 will not be correct for proper system operation; the refrigerator will not produce the required cooling effect.

As a next approach, it would seem obvious to provide valves to divert the refrigerant fluid leaving the cryosurface 23 either to cascade heat exchangers 11 during cooling or directly to compressor 1 during defrost. This design has problems of severely reduced reliability and increased system complexity. Small amounts of lubricating oil from the compressor 1 can reach the diverting valves at the outlet of cryosurface 23 and cause sticky valve operation and subsequent system failure. In the referenced patent the small amounts of oil which might migrate into the defrost circuit cannot cause such problems. The hot gas valve 20 remains warmer than the freezing point of oil at all times, and any residual oil is swept from the valve during each defrost cycle.

SUMMARY OF THE INVENTION

In accordance with the present invention, the problems of the prior art are minimized or eliminated and desireable characteristics and advantages of said patent are retained. There is provided a "Meissner" cryosurface, having a single tube fluid passage, which is mounted directly in a vacuum chamber workspace, thereby circumventing water vapor pumping speed (conductance) limits created by apertures, manifolds, and high vacuum valves, using a closed circuit mixed refrigerant refrigerator to eliminate wastes, costs, hazards and control problems associated with using liquid nitrogen. The cryosurface of the present invention can be rapidly heated (defrosted) and recooled to allow the vacuum chamber in which it is mounted to be periodically cycled to atmospheric pressure, this being a common mode of operation for batch processes. With rapid cycle capability and frequent periodic defrost, it is not necessary to dispose of large amounts of trapped water vapor accumulated over long periods of time.

The cryosurface operates at a temperature sufficiently cold to cryopump water vapor efficiently to a low $10^{-8}$ torr range, but not so cold as to cryopump $CO_2$, i.e., it operates as a selective cryopump. The refrigerator operates continuously, thus there are no short term temperature fluctuations to cause undulating chamber pressures from vapor pressure changes due to trapped materials. The subject system further eliminates the need for liquid refrigerant re-evaporator(s), suction line liquid refrigerant accumulators, or outside sources of heat for defrost, as required in many conventional refrigeration defrost systems. In addition, the cryosurface can be rapidly heated/defrosted without significant warming of the cascade heat exchangers and attendant high discharge pressures. This assures adequate internal refrigeration at all times, the system being ready to rapidly recool the cryosurface for each successive cryopumping cycle following each defrost cycle and a short dwell period with no heating or cooling prior to the start of cooling. A complete regeneration cycle including defrost, dwell and recool, can be accomplished in less than about eight minutes.

Briefly, the system is based upon a refrigeration process of the type described in U.S. Pat. No. 3,768,273 (Missimer), but can also be adapted to U.S. Pat. Nos. 3,203,194 (Fuderer), 2,041,725 (Podbielniak), or similar systems using the self-refrigerating cascade process. All employ compression of a mixture of vapor refrigerant components with partial condensation and partial evaporation with steps of intermediate cooling and at least partial phase separation. In the current invention, the evaporator of the refrigeration system is placed within a vacuum system as a "Meissner" coil previously described. Optionally it may be provided with extended surface(s). The cryosurface has a single tube passage for flow of either an evaporating low temperature refrigerant fluid for cooldown and continuous cold operation, or superheated compressed refrigerant gas for adding heat during the defrost cycle. Appropriate valves select whether cold fluid or superheated refrigerant gas flows through the tube in the cryosurface.

Low pressure refrigerant returning from the cryosurface to the cascade heat exchangers follows the same path through a recuperative heat exchanger during either a defrost or a cold cycle. This eliminates the need for any diverting valves in the return line from the cryosurface. The recuperative heat exchanger is active only during the defrost period when cold compressed gas flows through its high pressure side. This cold compressed gas is extracted from the coldest vapor location in the cascade heat exchangers after its rectification therein. It then flows through the high pressure side of the recuperative heat exchanger where it removes heat from and recools the returning low pressure warm vapor, is further superheated, passes through a defrost valve, and is fed to the coil. During the cold cycle, the returning low pressure refrigerant flows through the recuperative heat exchanger but, because the defrost valve is closed, there is no flow through the high pressure side of the recuperative heat exchanger and the exchanger is inactive.

BRIEF DESCRIPTION OF THE DRAWING

The FIGURE is a schematic diagram of refrigerant flow in accordance with the present invention.

DESCRIPTION OF THE PREFERRED EMBODIMENT

Referring now to the FIGURE, there is shown a preferred embodiment of a fast cycle water vapor cryopump in acordance with the present invention. The system includes a compressor 1 which receives refrigerant from a storage tank 2 and from line 3 which receives refrigerant from the auxiliary condenser 4. The compressor 1 feeds a discharge line 5 which passes the refrigerant fluid through a superheating exchanger 6 to a condenser 7 via line 8 and then through the auxiliary condenser 4 via line 9 to a first phase separator 10 and thence to a series of one or more cascade heat exchangers 11 and additional partial or full phase separator(s) 12. The coldest (last) phase separator 13 retains liquid refrigerant at its bottom for exit via line 14 and passes gaseous and possibly some liquid refrigerant to final cascade heat exchanger 15 via line 16. During the defrost cycle, cold compressed gaseous refrigerant leaves separator 13 and passes to recuperative heat exhanger 17 via line 18 to superheating exchanger 6 via line 19 to valve 20 operated by solenoid 21, to line 22 and into the inlet of cryosurface 23 where it adds heat to warm the cryosurface. At all times, including normal cooling for cryopumping and heating for defrost, low pressure refrigerant fluid leaves cryosurface 23 via line 24 to recuperative heat exchanger 17 and thence to cascade heat exchangers 11 via line 25 and returns through auxiliary condenser 4 and line 3 to compressor 1.

For operation in the defrost mode, cooling is turned off by closing liquid refrigerant valve 26 operated by solenoid 27. Cold compressed gaseous refrigerant leaves the top of phase separator 13 by tube 18. This cold compressed refrigerant gas is essentially oil free and retains a negligible amount of higher boiling fractions because of the several stages of cooling, partial condensation and phase separation of the refrigerant mixture circulated by compressor 1. This cold compressed refrigerant gas may be prewarmed in recuperative heat exchanger 17 depending upon the point in the defrost cycle, heated to a temperature between +50 degrees C. and +120 degrees C. in superheating exchanger 6, flows through hot gas refrigerant valve 20 operated by solenoid 21, then is admitted into the cryosurface 23 where it transfers heat for defrosting.

During the initial part of the defrost cycle, while the cryosurface 23 is cold, lower pressure refrigerant fluid leaves cryosurface 23 via line 24 at low temperatures. There is little heat transfer with cold compressed refrigerant gas in recuperative heat exchanger 17 and refrigerant fluid flows into cascade heat exchangers 11 without adding heat to them.

As the defrost cycle continues, cryosurface 23 warms up because of the heat added by compressed superheated refrigerant gas entering through valve 20 and lower pressure refrigerant fluid leaves cryosurface 23 via line 24 at temperatures warmer than during the initial period. This warm lower pressure refrigerant fluid commences to transfer significant amounts of heat to the cold compressed refrigerant in recuperative heat exchanger 17. This heat transfer recools the lower pressure refrigerant fluid before it enters cascade heat exchangers 11 and 15, thereby eliminating warming of cascade heat exchangers 11 and 15 and thus allowing continuous refrigeration operation and subsequent rapid recooling of cryosurface 23 shortly after it has been heated and defrosted. Cascade heat exchangers 11 and 15 are refrigerated during the defrost cycle by the flow of liquid refrigerant through the several internal throttling devices and evaporation of this liquid refrigerant as it mixes with returning recooled lower pressure refrigerant fluid in cascade heat exchangers 11 and 15.

At the end of the defrost cycle, there is a dwell period with both valves 20 and 26 closed. Cascade heat exchangers 11 are precooled and compressor 1 continues to operate under reduced load conditions. This precooling of internal heat exchangers provides cold thermal storage for rapid cooling at the start of cryopumping. During the dwell period, cryosurface 23 is neither heated nor cooled. After defrosting, it equilibrates with its surroundings, usually cooling down from a temperature warmer than ambient. Its exterior surface is warmer than ambient dewpoint temperature, therefore no moisture condensation occurs. The system is now ready for recooling and cryopumping.

For cooldown and to start cryopumping, solenoid 21 is deenergized and heated refrigerant fluid valve 20 remains closed. Cold liquid refrigerant fluid valve 26 is opened by energizing solenoid 27. Liquid refrigerent flows through throttling device 28 to cryosurface 23.

Cryopumping starts when a portion of the cryosurface 23, located within the workspace, cools to or below the equilibrium temperature (dew point) of water vapor present. In most high vacuum applications, the procedure is to turn on a cryopump when the vacuum chamber reaches "crossover" pressure, at which time rough pumping is stopped and the chamber is opened to the high vacuum pump. In this case, cryopumping will start at a cryosurface temperature of about −40 degrees C. to −60 degrees C. and continues with the cryosurface cooling to a normal operating range of −100 degrees C. to −140 degrees C. During cooling, there is no flow of compressed gaseous refrigerant through recuperative heat exchanger 17. Lower pressure returning refrigerant fluid flows through recuperative heat exchanger 17 with no significant temperature change, via line 25 to cascade heat exchangers 15 and 11. The operation of the refrigerator is unaffected by the presense of the recuperative heat exchanger 17. During the cooling and cryopumping period, superheating exchanger 6 is heated to the discharge temperature of compressor 1 because there is no flow of cold compressed refrigerant therethrough and thus exchanger 6 stores supplemental heat for faster defrost during the next process cycle.

This system can be used for other applications in addition to the one described. It is not limited to temperature conditioning of "Meissner" cryopumping coils in vacuum chambers. For instance, with appropriate modifications, it is possible to use its principles for rapid freezing and thawing of biological materials or for low (and high) temperature testing of component parts over a wide temperature range.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A system for controlling the temperature of a cryosurface, comprising:
   (a) a single coil cryosurface mounted in a vacuum chamber workspace,
   (b) valve means for selectively directing one of relatively cold and relatively hot refrigerant through said coil;
   (c) a first continuous refrigerant path controlled by said valve means and including said coil for cooling refregerant from said coil and transferring said cooled refregerant to said valve means, and
   (d) a second continuous refrigerant path controlled by said valve means and including said coil for heating a relatively warmer portion of the refrigerant from said first path and transferring said warmed refrigerant to said valve means.

2. A system as set forth in claim 1 wherein said valve means comprises a first refrigerant valve for controlling the flow of refrigerant in said first refrigerant path and a second refrigerant valve for controlling the flow of refrigerant in said second refrigerant path.

3. A system as set forth in claim 2 wherein said first and second refrigerant paths include heat exchange means in said first and second paths for cooling refrigerant in said first path and concurrently heating refrigerant in said second path.

4. A system as set forth in claim 1 wherein each said refrigerant path includes heat exchange means at the outlet of said coil.

5. A system as set forth in claim 2 wherein each said refrigerant path includes heat exchange means at the outlet of said coil.

6. A system as set forth in claim 1 wherein said first and second refrigerant paths include heat exchange means in said first and second paths for cooling refrigerant in said first path and concurrently heating refrigerant in said second path.

7. A system for controlling the temperature of a cryosurface, comprising:
 (a) a single coil cryosurface mounted in a vacuum chamber workspace,
 (b) a recuperative heat exchanger at the outlet of said coil,
 (c) a first refrigerant path including said coil and heat exchanger for cooling refrigerant exiting said heat exchanger,
 (d) a second refrigerant path including said coil and heat exchanger for heating refrigerant exiting said heat exchanger, and
 (e) valve means for selectively placing said coil and said heat exchanger into said first or said second path.

8. A system as set forth in claim 7 wherein said heat exchanger includes first and second fluid paths therein in thermal communication with each other, said first path being disposed at the outlet of said coil and said second path being disposed in said second refrigerant path.

9. A system as set forth in claim 8 wherein said valve means includes a valve in each of said first and second refrigerant paths, closure of said valve in said second refrigerant path closing or fluid flow in said second fluid path in said heat exchanger.

10. A system as set forth in claim 9 further including a condenser in said first refrigerant path and a superheating heat exchanger having first and second thermally coupled paths, said first path being disposed in said first refrigerant path downstream of said condenser and said second path being disposed in said second refrigerant path to heat fluid in said second refrigerant path and cool fluid in said first refrigerant path.

11. A system as set forth in claim 8 further including a condenser in said first refrigerant path and a superheating heat exchanger having first and second thermally coupled paths, said first path being disposed in said first refrigerant path downstream of said condenser and said second path being disposed in said second refrigerant path to heat fluid in said second refrigerant path and cool fluid in said first refrigerant path.

12. A system as set forth in claim 7 further including a condenser in said first refrigerant path and a superheating heat exchanger having first and second thermally coupled paths, said first path being disposed in said first refrigerant path downstream of said condenser and said second path being disposed in said second refrigerant path to heat fluid in said second refrigerant path and cool fluid in said first refrigerant path.

* * * * *